May 5, 1931. R. A. L. VOLET 1,803,493
ROTOR
Filed Oct. 2, 1928

René Alfred Laurent Volet
Inventor
by Louis Barnett
Attorney.

Patented May 5, 1931

1,803,493

UNITED STATES PATENT OFFICE

RENÉ ALFRED LAURENT VOLET, OF LA VAREUNE ST. HILAIRE, FRANCE

ROTOR

Application filed October 2, 1928, Serial No. 309,697, and in Belgium November 12, 1927.

The present invention relates to special structures for forming the rotors of electrical machines.

One of the objects of the invention is to provide means for more perfectly insulating the heads of the windings from one another and from the machine frame.

Another object is to provide more rugged means for maintaining the windings more effectively in position against the action of centrifugal force.

Further objects will appear in the course of the detailed description now to be given with reference to the accompanying drawings in which:—

Figure 1:
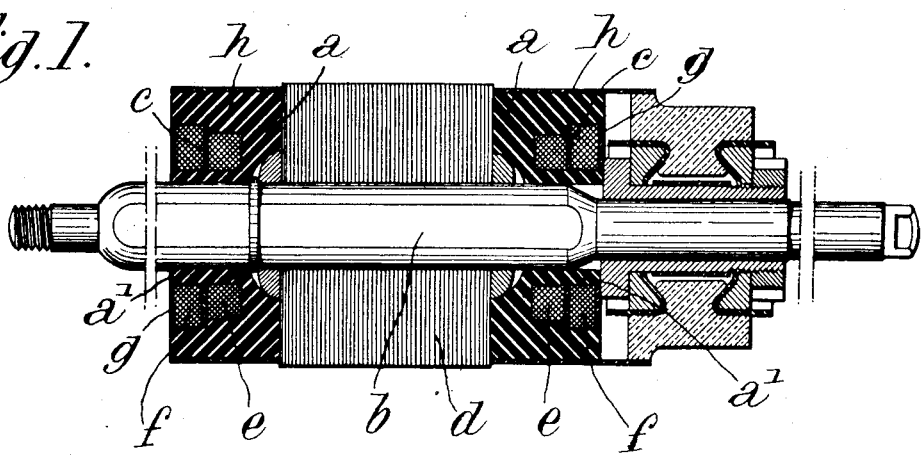
Fig. 1 is a diagrammatic section through one constructive embodiment of the invention.
Figure 2:
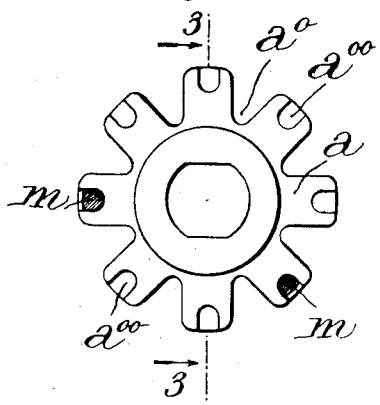
Fig. 2 represents an end-view of a retaining element.
Figure 3:
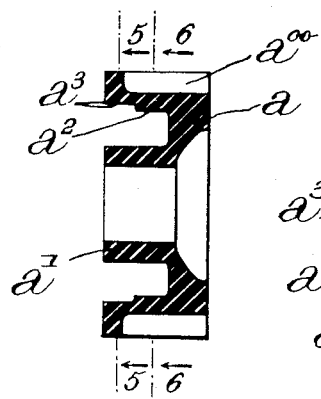
Fig. 3 is a section taken on line 3—3 of Fig. 2.
Figure 5:
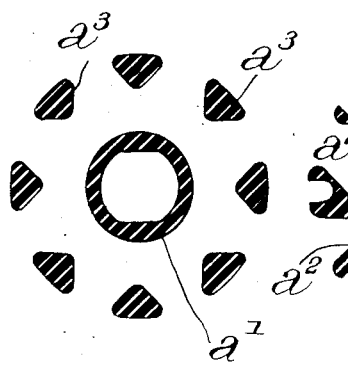
Figure 6:
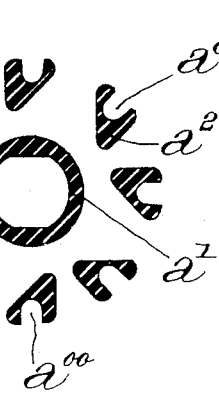
Figure 7:
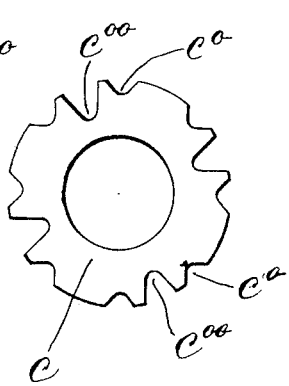

Figs. 5 and 6 are sections taken on lines 5—5 and 6—6 of Fig. 3;

Fig. 7 is an end-view of one of the special washers represented in Fig. 1.

Referring to the various figures of the drawings, $a$, $a$ are grooved end-elements adapted to be mounted on a shaft $b$, elements $a$ and $b$ having flattened portions coacting to prevent rotation of one relatively to the other; $c$ and $g$ bakelized washers adapted to insulate a pair of windings $e$ and $f$ wound over end-elements $a$, $a$ and a grooved laminated core $d$, and $h$, $h$ a pair of insulating tubes adapted to maintain balancing masses in place in a manner to be described further on.

End elements $a$, $a$ are formed with a central hub portion $a^1$ adapted to coact with shaft $b$ and carry a plurality of arms having end grooves formed therein to permit the passage of a plurality of layers of windings. The deepest part of each end groove is limited centrally by hub $a^1$ and peripherally by triangular masses $a^2$ (Fig. 6) permitting a winding of quadrilateral form such as $e$ (Fig. 4) to be wound therein. The more superficial portion of each end-groove is limited internally by $a^1$ and externally by masses $a^3$ continuous with masses $a^2$, masses $a^3$ presenting a triangular section (Fig. 5), preferably isoceles, permitting a winding of the type $f$ to be wound so as to lie out of phase with respect to winding $e$.

Washers $c$ are formed with notches $c^0$ and $c^{00}$ positioned so that when notches $c^0$ coact with the apices of triangular masses $a^3$, notches $c^{00}$ are in line with the main spaces between adjacent arms of the end-element.

A series of grooves $a^{00}$ are formed in the peripheral portion of each arm and are adapted to receive metallic masses $m$ for balancing the rotor. A pair of tubes $h$, $h$ fit endwise over each end element $a$, and maintain the masses in grooves $a^{00}$ in position.

The rotor is assembled in the following manner:—

Figure 4:
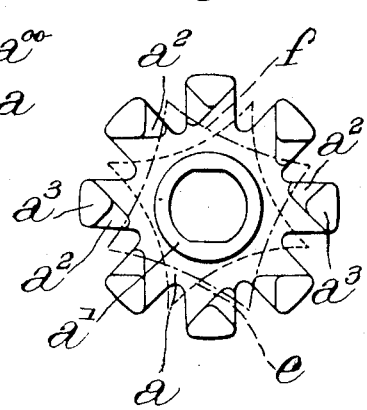
Fig. 4 illustrates a retaining element as seen from the end opposite to that shown in Fig. 2.

Laminated core $d$ having longitudinal grooves formed therein for receiving a winding is mounted securely against rotation on shaft $b$. End elements $a$, $a$ are then slipped onto the shaft so that the open spaces between adjacent arms are in line with the grooves in core $d$. A first winding is then laid down substantially in the manner shown by dotted line $e$ in Fig. 4 so as to fill the deeper portion $a^2$ of the end-grooves in elements $a$, $a$. Washers $c$, $c$ are then slipped onto the shaft so that notches $c^0$ engage with the apices of masses $a^3$. Winding $e$ is thus completely enclosed in a casing formed by the end-groove and washer $c$. A second winding (or a second layer of windings) $f$ may then be wound over washers $c$, $c$ substantially as shown in Fig. 4, so as to fill that portion of the end groove corresponding to $a^3$. An end-washer $g$ similar to washer $c$ is then slipped over winding $f$ and it suffices only to place balancing masses in grooves $a^{00}$ and tubes $h$ over the latter to complete the assembly.

While the foregoing description has been given with reference to a rotor carrying quadrilaterally mounted windings, it will at once be evident to those skilled in the art that, by modifying the number of arms on elements $a$ and changing the forms of masses $a^2$ and $a^3$, end-elements for windings of any form whatever may be provided.

What I claim is:—

1. A rotor comprising in combination a core having a plurality of longitudinal grooves formed therein adapted to receive a winding, a pair of end-elements having end-grooves formed therein in continuity with the longitudinal grooves in the core, said end-grooves presenting a pair of lateral walls, and a winding laid down in and lying below the level of the surfaces in which the grooves of the end-elements are formed.

2. The rotor defined in claim 1, in combination with a closure element fitting into contact with the lateral walls of the end-grooves so as to cover the winding lying within said end-grooves, a coil laid down over said closure element, said coil also lying below the level of the surfaces in which the grooves of the end-elements are formed, and an end closure fitting over said coil.

3. A rotor comprising a core having a plurality of longitudinal grooves formed therein, a pair of end-elements having grooves formed therein in continuity with the longitudinal grooves of the core, said end-elements also having a peripheral recess formed therein, a balancing mass positioned in said recess, a winding laid down in the grooves of the core and the end-elements, and means for retaining said mass in the recess.

4. A rotor comprising a core having a plurality of longitudinal grooves formed therein adapted to receive a winding, a pair of end-elements having grooves formed therein in continuity with the longitudinal grooves in the core, said end-elements also having a peripheral recess formed therein adapted to receive a balancing mass, and a tube formed to slide over and enclose said peripheral recess.

5. In a rotor, an end-element having a groove formed in the end thereof, said groove extending continuously around the end-element and sending off a plurality of prolongations towards the periphery of the end-element whereby a winding may be laid down so as to pass from one of said prolongation into another, said groove being limited internally and externally by lateral walls and having an open side adapted to permit the insertion of a winding.

6. The structure defined in claim 5, in combination with a closure element formed to fit into said groove.

7. The structure defined in claim 5, in combination with a closure element adapted to fit into said groove, said closure element being formed so that portions of the periphery thereof conform in outline to the lateral walls of said groove.

8. In a rotor, an end element having a groove formed in the end thereof, said groove being limited by spaced lateral walls presenting deep and superficial surfaces positioned in angular relation with one another.

In testimony whereof I have hereunto set my hand.

RENÉ ALFRED LAURENT VOLET.